Patented Mar. 2, 1943

2,312,392

UNITED STATES PATENT OFFICE 2,312,392

SOFT-BOND ARTICLE

Rupert S. Daniels, Union, N. J., assignor to Bakelite Corporation, New York, N. Y., a corporation of New Jersey No Drawing. Application May 18, 1940,
Serial No. 336,015

8 Claims. (Cl. 51—298)

This invention relates to bonded granular or fibrous articles and more particularly to abrasive implements, such as grinding wheels, and to methods for their preparation.

In Patent No. 2,125,893 issued August 9, 1938, there is described the preparation of soft-bond wheels and equivalent articles having the distinguishing property of softening or becoming crumbly without substantial fusion under grinding pressures at temperatures approximating 100° C. or above. That invention is based on the discovery that resins of the alkyd type or resins prepared from polyhydric alcohols and polybasic acids can be had in a condition characterized by the softening property and in that condition provide useful bonding agents for abrasives and equivalent fillers. It has now been found that resins of the phenol type can also be had in a condition characterized by the softening property and in that condition provide useful bonding agents for abrasives and other fillers. Heretofore resins of this type have found utility in the preparation of hard-bond wheels which, as explained in the aforesaid patent, operate on a different grinding principle and do not depend upon softening or crumbling of the bond.

For the purposes of the present invention, it is found preferable to use as a bonding agent the acid-catalyzed reaction product of a phenol and an aldehyde with the phenol present in excess of molar proportion and thus preparing a standard novolak resin. To the product so made is added either by grinding in a pebble mill or sheeting on differential rolls an amount of methylene-containing agent which will render it heat-reactive in the sense that it can be advanced or transformed to a less fusible condition but insufficient in amount to harden the resin to a state where it has a high flexural strength at excessive grinding temperatures. In general it has been found that to obtain the desired characteristics in the finished grinding wheel, it is desirable to add an amount of hardening agent equivalent to not more than about 6 per cent of hexamethylenetetramine based on the amount of novolak resin utilized. While it is possible to use a somewhat greater amount of hardening agent than that above specified, it is desirable that only that amount capable of giving a hardening action equivalent to about 6 per cent and usually not less than 3 per cent of hexamethylenetetramine, based on the amount of novolak resin used, be in available form. Thus, by controlling the extent of the reaction as by undercuring the grinding wheel, it is possible to limit the amount of methylene-containing substance made available for hardening even though the amount actually incorporated is in excess. The mixture is finely subdivided so as to pass through a 100 mesh screen or finer. An advantage residing in the finely subdivided or powder form is that the bonding agent can be maintained in suspension when mixed with abrasive grains, thereby contributing to the formation of the firm and uniform structure of the finished article.

As a hardening agent hexamethylenetetramine is ordinarily used and soft-bound products are obtained when the amount is restricted as explained in the foregoing. It has been found, however, that improved products result when in place of hexamethylenetetramine there is substituted a compound containing the azomethine group (—N=C<) or a polymer thereof; typical members of this class of compounds are anhydroformaldehydeaniline, anhydro glyoxal aniline, anhydro glyoxal cyclohexylamine, etc. Such compounds not only serve as hardening agents but also contribute to the softening action under heat of grinding to give a burnishing or polishing and prevent scoring under undue grinding pressure. In addition products with improved freedom from internal strain and superior water resistance are obtained.

In the manufacture of grinding wheels, the finely divided bonding agent is normally mixed with about seven times its weight of abrasive grains until a uniform distribution is secured; these proportions are subject to wide variation. The prepared mixture can then be charged as such into a mold hot enough to cause welding of the resin particles under the pressure applied or the mixture can be previously heated to secure the same result. The mixture can be subjected to the usual pressures of 1500 to 2000 pounds per square inch, or in some cases the pressure may run as high as 6000 pounds to the square inch. When heat is applied to weld the resin particles, it is then usually desirable to cool the mold to insure freedom from sticking.

While an article is in the mold, heat may be applied to harden or advance the resin bonding agent to the extent sufficient to give the needed grinding strength without further treatment. Preferably, however, the molded articles are removed from the molds and hardened by being placed in an oven and baked. For example, the initial baking temperature of the molded article can be as high as 85° C. or even higher, without causing resin segregation or loss in shape of the article, and after a period of about 15 hours the temperature can be raised gradually to about 168° C. or even as high as 200° C., or higher, the baking being continued for a length of time depending on the degree of resistance to softening desired in the finished article and the thickness of the article. As a specific instance, to produce wheels of about one-half inch thick that will not soften under temperatures generated in normal finish-grinding practice, the baking or hardening is continued at about a temperature of 168° C. for 7 to 10 hours; higher temperatures correspondingly shorten this period. As the effect of the baking is to harden or polymerize the resin content of the articles, the division of the baking operation into a low temperature stage followed by a longer and higher temperature stage is adopted to insure evaporation and removal of any volatile solvent, prior to a partial hardening of an outer resinous layer, or to avoid hardening of an outer layer in advance of an interior portion to such an extent that cracks will be caused to appear.

In the abrasive art there are two well-known forms of molding practiced, cold-molding and hot-molding. Cold-molding (which is generally more desirable commercially particularly when implements of appreciable thickness are to be prepared) may require a liquid resin, a solvent, or a liquid resin containing a minor proportion of a solvent or a non-solvent for temporarily bonding the mixture, unless sufficiently heavy pressure is applied to cause welding or coalescing of the resin particles. But for hot-molding a liquid may also be added with advantage to assist in securing a dispersion of the resin particles among the abrasive grains in the preparation of the resin-abrasive mixture prior to its molding.

When a solvent is included to assist in cold-molding, the underlying purpose in view is to wet the grains so that the powdered resin will adhere to them. For instance, solvents suitable for this purpose include a small amount of furfural or similar solvent and better results are obtained if a solvent is diluted with a non-solvent liquid, such as kerosene or creosote oil, to enhance dispersion. For hot-molding compositions solvents can be used, but a resin non-solvent alone, such as kerosene, has been found particularly useful. The addition of a non-solvent, such as kerosene, to a hot-molding mix is advantageous, as it permits of a hot or warm discharge from the mold, that is, there is substantially little or no cooling of the mold required, for the objectionable sticking is found to be absent; there are also other advantages as noted hereinafter. The addition, in small amounts, of a lubricant to the mix, such as calcium stearate, etc., is also of assistance in avoiding any possibility of sticking.

Solubility or partial solubility in the aforementioned solvents, however, is in general characteristic of the powdered phenolic resin only when it is in a very fusible form, that is, when the resin has not been advanced to any material extent by heat-hardening. It has been found that such a limitation upon solvent use largely can be obviated and a better wetting action secured by a liquid resin or a liquid resin in which a small amount of solvent is included; the liquid resin can be a phenolic resin formed by reacting phenol and paraformaldehyde in the presence of an alkaline catalyst. It is preferably utilized in a manner so as to wet the powdered phenolic resin and grit particles but not to dissolve the resin to any material extent; for example, it can be added gradually or at one time to the resin and grit mixture during a ball-milling operation, or more preferably it is first mixed with the abrasive grains in order to coat them and the powdered phenolic resin is then added. Up to 30 per cent or more of the total resin content can be incorporated in the form of liquid resin. Non-solvents can be included in the liquid resin as indicated above.

The following examples are given in order to illustrate the invention more clearly:

*Example 1.*—875 grams of #50 aluminous oxide grain were mixed with 20 grams of a phenol formaldehyde liquid resin, and then 105 grams of a powdered novolak resin, blended with 5 per cent by weight of hexamethylenetetramine based on the novolak resin, were mixed with the wetted grain. The granular abrasive mixture was cold molded into bars approximately 6" x 1" x ½", using 130 grams of mixture for each bar. The bars were baked at temperatures ranging from room temperature to 176° C. in steps as follows:

Heated up to 87° C. over a period of ½ hr.;
Held at 87° C. for 15 hours;
Increased from 87° C. to 176° C. over a period of 8½ hrs.;
Held at 176° C. over a period of 7¾ hrs. and then cooled down in the oven.

Three bars, which were to be tested at room temperature, were given an additional one hour heat-treatment at 200° C. so as to be comparable to three of the bars which were tested at 200° C. The flexural strength in lbs./sq. in. of the bars tested at room temperatures was 7120, as compared to 1050 for those tested at 200° C. The modulus of elasticity at 25° C. was almost $4.2 \times 10^6$, and the impact strength about 1.95 foot pounds per square inch.

*Example 2.*—525 grams of #50 aluminous oxide grains were mixed with 12 grams of a phenol-formaldehyde liquid resin, and then 63 grams of a powdered novolak resin, which had been previously mixed with 20 per cent by weight of a high formaldehyde liquid resin based on the novolak resin, were mixed with the wetted grain. The high formaldehyde liquid resin is prepared from 2.3 mols of formaldehyde reacted with 1 mol of phenol in the presence of an alkylene catalyst. The bars were molded and baked as in the above experiment in steps as follows:

Heated up to 85° C. over a period of ½ hr.;
Held at 85° C. for 15¼ hrs.;
Increased from 85° C. to 171° C. over a period of 8¾ hrs.;
Held at 171° C. over a period of 7½ hrs. and then cooled down in the oven.

The flexural strength of the bars in lbs./sq. in., when tested at room temperature, was 5040, as compared to 325 for those at 200° C. The modulus of elasticity at 30° C. was $4.0 \times 10^6$, and the impact strength 1.63 foot pounds per square inch.

*Example 3.*—830 grams of equal parts of #12, #14 and #16 aluminous oxide grain were mixed with 19 cc. of a mixture containing 75 per cent by weight of furfural and 25 per cent by weight of cresol. The wetted grains were then mixed with a blend of 60 grams of cryolite and 110 grams of powdered resin, which consisted of a mixture of 75 per cent by weight of a novolak resin and 25 per cent by weight of anhydro-formaldehyde aniline. Six abrasive bars, approximately 6" x 1" x .53", were molded from the mixture, using 150 grams and pressing to size. The bars were baked at temperatures ranging from room temperature to 180° C. in steps as follows:

Heated up to 85° C. over a period of ½ hr.;
Held at 85° C. for 15 hrs.;
Increased from 85° C. to 176° C. over a period of 9 hrs.;
Held at 176° C. over a period of 10¼ hrs. and then cooled down in the oven.

The average flexural strength of bars tested at room temperature was 1700, as compared to 320 for those tested at 200° C. The modulus of elasticity at 25° C. was 1.43 x 10$^6$.

In the foregoing Example 3, the substitution of anhydro formaldehyde aniline as a hardening agent shows a decided softening action and a corresponding loss in flexural strength. It is desirable in many cases to increase the strength; this can be controlled by including in part hardening agents which give typical hard-bond products. This is illustrated by the following examples.

Example 4.—1225 grams of #50 aluminous oxide abrasive grains were mixed with 28 grams of a one-step liquid formaldehyde resin. To the coated grains were added 147 grams of a powdered potentially reactive resin made up by blending and grinding together

|  | Parts |
|---|---|
| Novolak resin | 66.4 |
| Anhydro formaldehyde aniline | 25. |
| Hexamethylenetetramine | 4.65 |
| Hexa triphenol | 3.95 |

The abrasive mixture was then ready for molding. For test purposes bars as before were molded and baked at an increasing temperature up to 185° C. in approximately 48 hours. The bars were separated into sets; one set was tested at room temperature, and a second at 200° C. with the following average results:

|  |  | Flexural strength | Total deflection |
|---|---|---|---|
|  |  | Lbs./sq. in. | Inches |
| 1 | Room T | 4,023 | .035 |
| 2 | 200° C | 1,313 | .088 |

Example 5.—A molding mixture similar to that of Example 4 was made with the exception that anhydro glyoxal aniline was substituted for anhydro formaldehyde aniline. Bars were made, baked and tested as before with the following average results:

|  |  | Flexural strength | Total deflection |
|---|---|---|---|
|  |  | Lbs./sq. in. | Inches |
| 1 | Room T | 3,947 | .025 |
| 2 | 200° C | 999 | .053 |

Example 6.—A set of abrasive bars like that of Example 4 was made but with anhydro glyoxal cyclohexylamine substituted for anhydro formaldehyde aniline. Tests gave the following average results:

|  |  | Flexural strength | Total deflection |
|---|---|---|---|
|  |  | Lbs./sq. in. | Inches |
| 1 | Room T | 3,067 | .021 |
| 2 | 200° C | 1,155 | .042 |

Example 7.—To show the significance of the results obtained in the foregoing examples, testing bars were prepared in which a powdered potentially reactive resin was used, i. e. the amount of hardening agent included with the novolak resin was that yielding a typical heat-hardenable resin. In this case 9 parts by weight of hexamethylenetetramine were mixed with 91 parts of a novolak resin. This was added in the proportion of 147 grams to 1225 grams of #50 aluminous oxide abrasive grains coated with 28 grams of a one-step liquid phenol-formaldehyde resin. The composition was molded into bars and baked as stated in Example 4 and the average results were as follows:

|  |  | Flexural strength | Total deflection |
|---|---|---|---|
|  |  | Lbs./sq. in. | Inches |
| 1 | Room T | 4,227 | .032 |
| 2 | 200° C | 3,683 | .065 |

It is to be noted that there was but little loss in strength upon heating to 200° C.

The proportion of the total resin supplied in a wetting agent need not be large so long as there is a sufficient amount present to exert a preferential action of causing the solid resin particles to adhere to the grains instead of to each other. For example, the resin incorporated in the solvent may be but 1 per cent of the total resin content or it may rise as high as 30 per cent or more.

High pressures are not required when a solvent or liquid resin is present. The composition in such a case can be pressed into the mold by a trowel, rolling cylinder, or other suitable means. When so compacted, the article can be removed, for with the usual proportions of filler and resin, the molded piece has sufficient stiffness at normal room temperatures to permit handling.

The porosity of the article can be regulated by the size of the grit, or the use of mixed grains of different sizes, and to some extent by the proportions of grit to resin. For example, the percentage of resin may be so high as 20 per cent by weight, or thereabouts, and as low as 5 per cent by weight, or less, and give a satisfactorily bonded product, the article with the higher resin content having a greater surface density. Density is also increased by hot pressing or molding, and a very dense article can be obtained when a solvent, such as furfural, is included in the mixture for hot-molding. On the other hand, the inclusion of a non-solvent, such as kerosene, gives an open structure of uniform character, particularly when pressed in a cold mold and thereafter baked, though the transverse strength is then somewhat reduced. In general, hot-molded articles have higher transverse strength than those which are cold molded.

The term phenolic or phenol resin as used herein is intended to include any of the synthetic resins prepared from a phenol and an aldehyde and in particular resins prepared from phenol and formaldehyde such as novolak resins; however, various other resins prepared from homologs of phenol or aldehydes other than formaldehyde can be used, the essential requirement being that the resins used are deficient in the amount of available methylene-containing hardening agent to the extent that the resin bond when hardened has the property of crumbling or softening at grinding pressures and temperatures exceeding those at which the implements are intended to operate. Changes in properties can also be secured by varying the proportions of the resin reactants as for instance by decreasing the proportion of formaldehyde which lowers the softening point. By these various means—extent of baking, proportions, modifying ingredients, etc.—wheels can be produced which soften at practically any temperature varying from 100° C. or less and up to 200° C. or higher. In the above examples where methylene-containing substances are referred to it is intended that the amounts of available methylene-containing hardening agent be preferably not greater than that which would be equivalent to approximately not more than 6 per cent of hexamethylenetetramine based on the amount of novolak resin used in fabricating the abrasive article.

Furthermore, though the above description is specifically directed to grinding wheels using an abrasive as a filler, the invention is applicable to the manufacture of other articles and with the use of any other filler, either powdered, granular or other structural forms, both natural and artificial, and of a size which gain by being bonded together and generally designated as granules; the invention therefore is not to be interpreted as restricted to a particular resin, filler or article of manufacture.

This application is a continuation-in-part of U. S. application Serial No. 223,323 filed August 5, 1938.

What is claimed is:

1. Method of preparing an abrasive article of the soft-bond type from granules having as a bond a phenolic resin which comprises mixing the granules with a phenolic novolak resin together with a hardening agent selected from the group consisting of hexamethylenetetramine, high formaldehyde phenolic resin and compounds containing the azomethine group and polymers thereof, said hardening agent being present in amount to yield available methylene equivalent to about 3 to 6 per cent of hexamethyleneteramine based on the weight of the novolak resin, molding the mixture, and baking the molded article to a state characterized by a softening of the bond that becomes crumbly without fusion under grinding pressure at temperatures approximating 100° C. or higher.

2. Method of preparing an abrasive article of the soft-bond type from granules having as a bond a phenolic resin which comprises mixing the granules with a phenolic novolak resin together with a hardening agent containing the azomethine group and another hardening agent present in amount to yield available methylene equivalent to about 3 to 6 per cent of hexamethylenetetramine based on the weight of the novolak resin, molding the mixture, and baking the molded article to a state characterized by a softening of the bond that becomes crumbly without fusion under grinding pressure at temperatures approximating 100° C. or higher.

3. Method of preparing an abrasive article of the soft-bond type from granules having as a bond a phenolic resin which comprises mixing the granules with a phenolic novolak resin together with a hardening agent containing the azomethine group, molding the mixture, and baking the molded article to a state characterized by a softening of the bond that becomes crumbly without fusion under grinding pressure at temperatures approximating 100° C. or higher.

4. Method of preparing an abrasive article of the soft-bond type from granules having as a bond a phenolic resin which comprises mixing the granules with a phenolic novolak resin together with anhydro formaldehyde aniline and hexamethylenetetramine, molding the mixture, and baking the molded article to a state characterized by a softening of the bond that becomes crumbly without fusion under grinding pressure at temperatures approximating 100° C. or higher.

5. Bonded article of the soft-bond type comprising a filler secured by a binder composition of a phenolic novolak resin and a hardening agent selected from the group consisting of hexamethylenetetramine, high formaldehyde phenolic resin and compounds containing the azomethine group and polymers thereof, said hardening agent included in amounts to yield available methylene equivalent to about 3 to 6 per cent of hexamethylenetetramine based on the weight of novolak resin, said binder being in a state of hardness characterized by softening by crumbling without substantial fusion under grinding pressure at temperatures approximating 100° C. or higher.

6. Bonded article of the soft-bond type comprising a filler secured by a binder composition of a phenolic novolak resin and a hardening agent containing the azomethine group and another hardening agent included in amount to yield available methylene equivalent to about 3 to 6 per cent of hexamethyleneteramine based on the weight of novolak resin, said binder being in a state of hardness characterized by softening by crumbling without substantial fusion under grinding pressure at temperatures approximating 100° C. or higher.

7. Bonded article of the soft-bond type comprising a filler secured by a binder composition of a phenolic novolak resin and a hardening agent including a compound containing the azomethine group, said binder being in a state of hardness characterized by softening by crumbling without substantial fusion under grinding pressure at temperatures approximating 100° C. or higher.

8. Bonded article of the soft-bond type comprising a filler secured by a binder composition of a phenolic novolak resin and a hardening agent including anhydroformaldehyde aniline and hexamethylenetetramine, said binder being in a state of hardness characterized by softening by crumbling without substantial fusion under grinding pressure at temperatures approximating 100° C. or higher.

RUPERT S. DANIELS.